April 25, 1967  H. W. MACIOROWSKI  3,315,512
CUT-OFF MEANS IN WIRE OR STRIP FORMING MACHINE
Filed Feb. 1, 1965
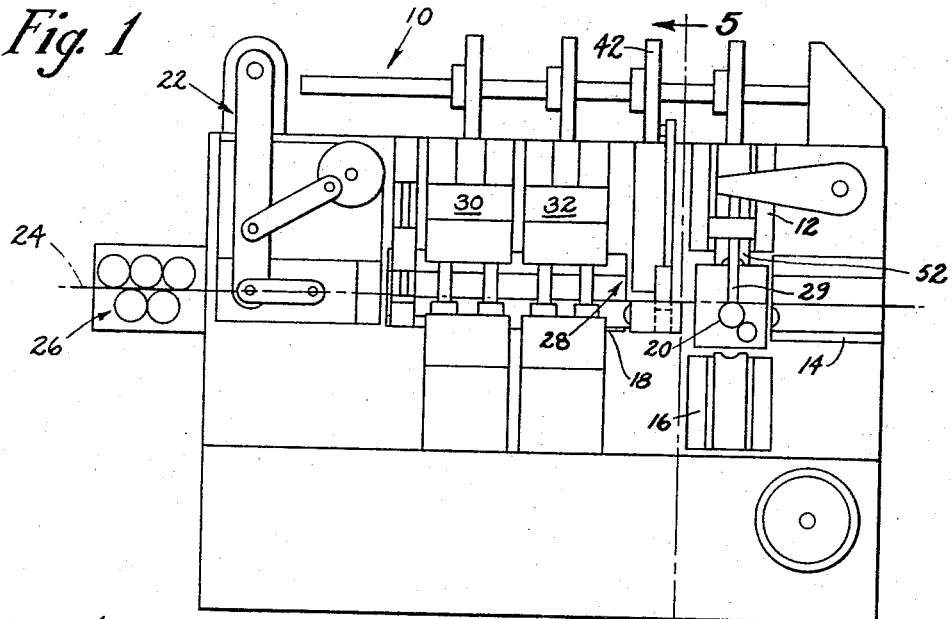
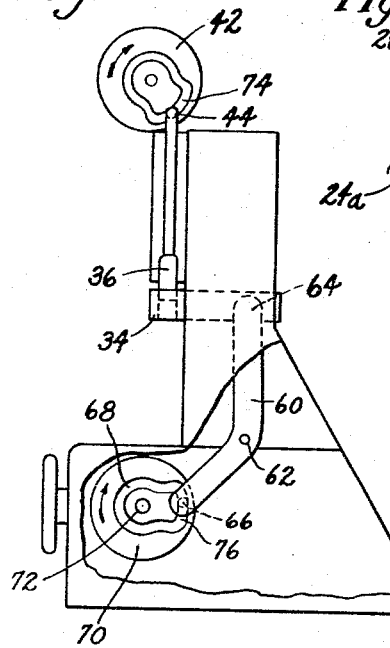
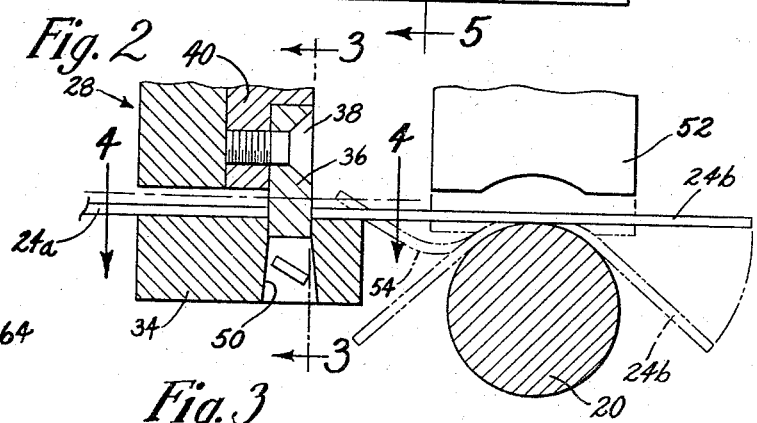
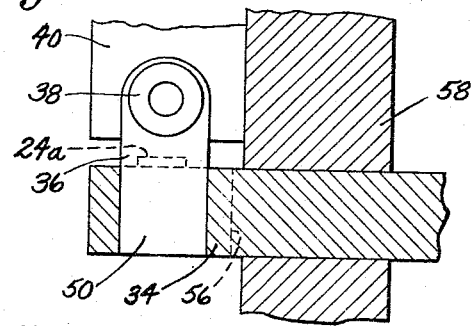
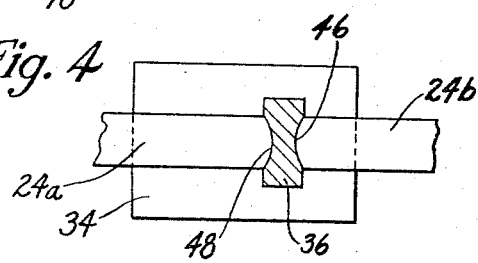
INVENTOR.
Henry W. Maciorowski
BY
McCornish, Paulding & Huber United States Patent Office 3,315,512
Patented Apr. 25, 1967

3,315,512
CUT-OFF MEANS IN WIRE OR STRIP
FORMING MACHINE
Henry W. Maciorowski, Westfield, Mass., assignor to
The Torrington Manufacturing Company, Torrington,
Conn., a corporation of Connecticut
Filed Feb. 1, 1965, Ser. No. 429,292
5 Claims. (Cl. 72—330)

This invention relates to wire or strip forming machines of the type wherein wire or strip is bent or otherwise formed about a mandrel by a plurality of tools carried on slides disposed in a hub-spoke arrangement with respect to the mandrel. More particularly, the invention relates to cut-off means in a forming machine of the type referred to.

In a conventional forming machine of the type mentioned, a feed mechanism advances a continuous length of wire or strip and a cut-off means adjacent the forming mandrel severs the length of wire or strip intermittently to provide individual workpieces at the mandrel. When a simple right angle linear cut is desired, no problem is encountered, but when it is necessary to cut out a portion of the wire or strip in a more complex angular or arcuate cut-off operation, an anvil with an opening for receiving a cut-off tool becomes essential and the portion of the anvil nearest the forming mandrel may raise an interference problem. That is, the trailing end portion of a workpiece, having been severed from the length of wire or strip, may engage and "hang up" on the said anvil portion when the first forming tool engages the workpiece in an initial forming operation and tends to move the said trailing end portion transversely with respect to the line or path of wire or strip movement. Thus, in conventional forming machines of the type mentioned, severe limitations on cut-off and forming operations may be encountered when relatively complex cut-off configurations are required.

It is the general object of the present invention to provide in a forming machine of the type referred to, a cut-off means including an anvil which raises no interference problem whatever with a trailing end portion of a workpiece and which thus adds significantly to the versatility of the cut-off operations in the forming machine.

A further and more specific object of the invention resides in the provision of a cut-off means having a movable anvil wherein the anvil can be moved to one position for a cutting operation and to a second remote position where it will not interfere with transverse movement of a trailing end portion of a workpiece.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a side elevation in somewhat schematic form of a forming machine constructed in accordance with the present invention.

FIG. 2 is an enlarged somewhat schematic side view partially in section which shows part of a cut-off means, a mandrel, and a forming tool in the machine.

FIG. 3 is a schematic section taken generally as indicated at 3—3 in FIG. 2.

FIG. 4 is a schematic section taken generally as indicated at 4—4 in FIG. 2.

FIG. 5 is a schematic section of the machine of FIG. 1 taken generally as indicated at 5—5 in FIG. 1.

Referring particularly to FIG. 1, a wire or strip forming machine is indicated generally at 10. The wire or strip forming machine 10 is adapted to accommodate wire or strip of various types. That is, both feeding and forming mechanisms therein are adapted to handle wire or strip having various cross-sectional shapes. In the description which follows, the machine is described in conjunction with the forming of a workpiece which is cut from a continuously length of wire having a flat or rectangular cross section. Such wire is often referred to as "strip" and this term will be used in the description which follows, it being understood, however, that the machine may also be adapted for formation of workpieces from various other cross-sectional shapes. Accordingly, the term "strip" as used throughout the description which follows, should be construed in a broad sense and equivalent to the term "wire" so as to refer to a continuous thread or slender rod of metal of any cross-sectional shape such as round, square, triangular, flat or irregular.

The strip forming machine shown in FIG. 1 is of the four-slide type, the forming mechanism thereof comprising four slides 12, 14, 16 and 18 disposed in a hub-spoke arrangement about a center form or mandrel 20. The several slides are preferably movable in a vertical plane, as shown, and forming tools are provided on their contiguous ends adjacent the mandrel 20. Suitable cams move the slides inwardly in timed relation to each other so that the tools thereon sequentially cooperate with the mandrel 20 to bend a workpiece around the mandrel to provide a product or article of a desired shape and form. Included in the forming machine 10 is a feed mechanism indicated generally at 22, which is operated by suitable cams and which functions to feed the strip along a horizontal line or path 24 longitudinally to the mandrel 20 at the forming station in proper timed relation with the operation of the forming tools. Before entering the feed mechanism 22, the strip passes through a straightener 26, shown at the left in FIG. 1.

There is also included in the forming machine 10 a cut-off means 28 which is disposed between the feed mechanisms 22 and the mandrel 20 and adjacent the latter and which operates to cut the strip fed from left to right by the feed mechanism 22 into workpieces of desired length. That is, after the several slides are operated to form a workpiece around the mandrel 20 and the formed workpiece is removed from the mandrel, the feeding mechanism 22 advances the strip rightwardly a predetermined distance and it is then held by a stock check 30 in position atop the mandrel 20. The cut-off means 28 then operates to cut from the right-hand end of the strip a workpiece to be formed by the tools and mandrel during the next sequence of operation.

First and second cam or eccentric actuated vertical presses 30, 32 are shown as being included in the forming machine 10, but the provision of such presses is optional. The presses may be used to carry out various stamping operations and they are, of course, most advantageously used in the forming of flat stock.

As mentioned, the forming machine of FIG. 1 is operable in fixed cycles with one article or product being formed within each cycle. Power operating means for the various mechanisms in the machine are, of course, included within the machine housing but description thereof is deemed unnecessary for a full understanding of the present invention. Further information as to the construction and operation of forming machines of the type referred to may be found in the Werner Vogt Patent No. 3,052,392 entitled, "Wire Forming Machine," and the Werner Vogt and Erman V. Cavagnero Patent No. 3,092,-709 entitled, "Attachment for a Wire or Strip Forming Machine."

Referring now particularly to FIGS. 2 and 3, the cut-off means 28 is shown in greater detail and will be seen to comprise an anvil 34 and a cut-off tool 36 disposed thereabove and on an opposite side of the strip 24a. The cut-off tool 36 is held by a suitable screw 38 on a vertically reciprocable cut-off device 40 operated by a cam 42 and follower 44, best shown in FIGS. 1 and 5. As best shown in FIG. 4, the cut-off tool 36 is adapted to provide arcuate or gradually rounded end edges at each severed portion of the strip 24a. That is, a severed workpiece 24b has a gradually rounded or arcuate end edge portion 46 and the leading end of the strip 24a, or the leading end of the next succeeding workpiece as it may be considered, is provided with a gradually rounded end edge portion 48. Thus, the operation of the cut-off tool 36 may be viewed as being somewhat in the nature of a blanking operation wherein the tool 36 crosses the horizontal and longitudinal path of movement of the advanced strip 24a, severs the strip and enters a suitable opening 50 in the anvil 34.

Still referring to FIG. 2, it will be observed that a tool 52 carried by the slide 12 descends upon the workpiece 24b after it has been severed from the strip 24a so as to bend the workpiece partially about the mandrel 20 with the leading and trailing end portions of the workpiece being moved transversely and, more specifically, arcuately downwardly. As will be clear from the broken line showing 54, the trailing end portion of the workpiece tends to interfere or "hang up" on the portion of the anvil 34 closest the mandrel 20 if the anvil is permitted to remain in the position shown.

In accordance with the present invention, the anvil 34 is adapted for transverse movement and, more specifically, the anvil is movable horizontally rearwardly from its first or one position shown to a second position wherein it will not interfere with the downward arcuate movement of the trailing edge portion of a workpiece such as 24b. A broken line 56 in FIG. 3 shows the rearward position of the anvil 34 and it will be clear that the anvil is mounted for slidable movement within a portion 58 of the machine frame or bed.

In FIG. 5, there is shown a specific mechanism for effecting forward and rearward movement of the mandrel 34 to its first and second positions but it will be quite obvious that other operating mechanisms may be employed within the scope of the invention. The mechanism shown comprises a lever 60 which is pivoted approximately at its center at 62 for swinging movement in a vertical plane. The upper end portion of the lever 64 is pivotally connected with the anvil 34 so as to move the same forwardly and rearwardly and a lower end portion of the lever carries a cam follower 66. The cam follower 66 is entered in a cam groove or track 68 in a cam 70. The cam 70 is rotatably mounted on a shaft 72 so as to be driven in timed relationship with the aforementioned cam 42 and the remaining mechanisms and devices in the forming machine.

When a forming step has been completed and the time arrives for advancing the strip 24a rightwardly, the cutting tool 36 must be maintained in an upward position and the anvil 34 is shown as being in a rearward position although it may reside in its forward position without interference with the strip. When a feeding portion of a cycle of machine operation is complete with the leading end portion of the strip 24a in the position shown above the mandrel 20, the anvil 34 must be in its forward position and the cutting tool 56 must be lowered in a cut-off operation so as to sever the strip and form an individual workpiece such as 24b. The outer portion 74 of the cam track on the cam 72 represents downward movement of the cutting tool 36 and the outer portion 76 of the cam track 68 on the cam 70 represents that portion of the cycle of operation when the anvil is in its forward position as shown. Each cam track portion 74 and 76 may be approximately 45° in length as shown.

From the foregoing, it will be apparent that the problem of interference between the trailing edge portion of a workpiece and a cutting anvil is completely eliminated with the present invention. Relatively complex configurations of end portions of workpieces can be provided for with ease and facility with the mechanism of the present invention and yet simplicity of operation and durability in long use of the forming machine is retained.

The invention claimed is:

1. The combination in a wire or strip forming machine of a mandrel and a plurality of slides disposed in a hub-spoke arrangement about the mandrel, said slides carrying forming tools on contiguous ends thereof and being movable toward and away from the mandrel so that the tools thereon can cooperate with the mandrel to form a wire or strip workpiece at the mandrel, a feed mechanism for advancing a continuous length of wire or strip to the mandrel along a longitudinal path of movement, a cut-off device disposed between the feed mechanism and the mandrel and adjacent the latter, said cut-off device including a cut-off tool and means for moving the same transversely in one and an opposite direction so as to cross the aforesaid longitudinal path of movement of said wire or strip, a transversely movable anvil having one position adjacent the path of movement of the wire or strip on a side thereof opposite said cut-off tool so as to cooperate therewith in severing the wire or strip to form a workpiece at the mandrel, and means for moving the anvil transversely between said one position and a second position remote from the path of movement of the wire or strip to allow for free transverse movement of the trailing end portion of a workpiece severed by the cut-off tool and anvil.

2. The combination in a wire or strip forming machine of a mandrel and a plurality of slides disposed in a hub-spoke arrangement about the mandrel, said slides carrying forming tools on contiguous ends thereof and being movable toward and away from the mandrel so that the tools thereon can cooperate with the mandrel to form a wire or strip workpiece at the mandrel, a feed mechanism for advancing a continuous length of wire or strip to the mandrel along a longitudinal path of movement, a cut-off device disposed between the feed mechanism and the mandrel and adjacent the latter, said cut-off device including a cut-off tool and means for moving the same transversely in one and an opposite direction so as to cross the aforesaid longitudinal path of movement of said wire or strip, a transversely movable anvil having one position adjacent the path of movement of the wire or strip on a side thereof opposite said cut-off tool, said anvil having a surface extending along the path of wire or strip movement and having an opening in said surface for receiving and at least approximately fitting said cut-off tool so as to cooperate therewith in severing the wire or strip to form a workpiece at the mandrel, and means for moving the anvil transversely between said one position and a second position remote form the path of movement of the wire or strip to allow for free transverse movement of the trailing end portion of a workpiece severed by the cut-off tool and anvil.

3. The combination in a wire or strip forming machine as set forth in claim 2 wherein said means for moving said cut-off tool comprises a cam follower included in said cut-off device and a rotatable cam included in the forming machine.

4. The combination in a wire or strip forming machine as set forth in claim 3 wherein said means for moving said anvil comprises a rotatable cam and a pivotally supported lever having one end portion connected with the anvil and an opposite end provided with a cam follower engaged with the cam.

5. The combination in a wire or strip forming machine of a horizotnally extending mandrel and a plurality of vertically movable slides disposed in a hub-spoke arrangement about the mandrel, said slides carrying forming tools on contiguous ends thereof and being movable toward and away from the mandrel so that the tools thereon can cooperate with the mandrel to form a wire or strip workpiece at the mandrel, a feed mechanism for advancing a continuous length of wire or strip horizontally to the mandrel along a longitudinal path of movement, a cut-off device disposed between the feed mechanism and the mandrel and adjacent the latter, said cut-off device including a cut-off tool and means for moving the same transversely and vertically in one and an opposite direction so as to cross the aforesaid longitudinal path of movement of said wire or strip, a horizontal and transversely movable anvil having one position adjacent the said path of movement of the wire or strip on a side thereof opposite said cut-off tool so as to cooperate therewith in severing the wire or strip to form a workpiece at the mandrel, and means for moving the anvil transversely between said one position and a second position remote from the path of movement of the wire or strip to allow for free transverse movement of the trailing end portion of a workpiece severed by the cut-off tool and anvil.

No references cited.

WILLIAM W. DYER, JR., *Primary Examiner.*

LEONIDAS VLACHOS, *Examiner.*